United States Patent

Terrell

[15] 3,666,864

[45] May 30, 1972

[54] COMPOSITIONS AND METHODS FOR PRODUCING ANESTHESIA

[72] Inventor: Ross C. Terrell, Plainfield, N.J.

[73] Assignee: Airco, Inc., New York, N.Y.

[22] Filed: Aug. 31, 1970

[21] Appl. No.: 68,474

Related U.S. Application Data

[63] Continuation-in-part of Ser. No. 877,031, Nov. 14, 1969, abandoned, which is a continuation-in-part of Ser. Nos. 712,903, Mar. 14, 1968, abandoned, and Ser. No. 712,912, Mar. 14, 1968, abandoned.

[52] U.S. Cl. ..........................................424/342, 260/614 F
[51] Int. Cl. ........................................................A61k 13/00
[58] Field of Search ..............................424/342; 260/614 F

[56] References Cited

UNITED STATES PATENTS

| | | | |
|---|---|---|---|
| 3,449,504 | 6/1969 | Terrell | 424/342 |
| 3,469,011 | 6/1964 | Terrell | 424/342 |

*Primary Examiner*—Jerome D. Goldberg
*Attorney*—Edmund W. Bopp, H. Hume Mathews and Roger M. Rathbun

[57] ABSTRACT

The present invention relates to anesthetic compositions containing 1,1,2-trifluoro-2-chloro-2-bromoethyl difluoromethyl ether and 1,1,2-trifluoro-2-bromoethyl difluorochloromethyl ether, and to the method of anesthetizing warm blooded air breathing mammals by administering an effective amount of each anesthetic composition.

6 Claims, No Drawings

3,666,864

COMPOSITIONS AND METHODS FOR PRODUCING ANESTHESIA

DESCRIPTION OF THE INVENTION

The present application is a Continuation-in-Part of pending U.S. application Ser. No. 877,031, filed Nov. 14, 1969, now abandoned, which was a Continuation-in-Part of U.S. application Ser. No. 712,903, filed Mar. 14, 1968, now abandoned and application Ser. No. 712,912, filed Mar. 14, 1968, now abandoned.

This invention relates to novel anesthetic compositions containing 1,1,2-trifluoro-2-chloro-2-bromoethyl difluoromethyl ether and 1,1,2-trifluoro-2-bromoethyl difluorochloromethyl ether, and to the use of each composition in producing anesthesia in anesthetic susceptible air breathing mammals. The compounds of the present invention have the following generic formula:

$$CF_2XOCF_2CFBrX$$

where X = H and Cl alternately, and one X is chlorine.

The compound 1,1,2-trifluoro-2-chloro-2-bromoethyl difluoromethyl ether has the following formula:

$$CHF_2OCF_2CFClBr$$

It is normally a clear, colorless liquid with a not unpleasant odor. It has the following physical properties: boiling point 82° C.; vapor pressure 125 mm at 30° C.; specific gravity 1.7; refractive index $n_D^{20}$ 1.3514; and a molecular weight of 263.5. The compound is non-flammable, soda lime stable and is a potent anesthetic for inhalation anesthetic susceptible mammals.

The compound 1,1,2 trifluoro-2-bromoethyl difluorochloromethyl ether has the following formula: $CF_2ClOCF_2hfbr$. It is normally a clear, colorless liquid with a very slight odor. It has the following physical properties: boiling point 81° C.; vapor pressure 95 mm at 25° C; specific gravity 1.7; refractive index $n_D^{20}$ 1.3465 and molecular weight 263.5. The compound is non-flammable, soda lime stable, and is a potent anesthetic for inhalation anesthetic susceptible mammals. The compound is also easily miscible with other organic liquids including fats and oils and has useful solvent properties; for example, as a solvent for fluorinated olefins and other fluorinated materials such as fluoro waxes. It may be used to prepare pastes and dispersions of such materials useful for coatings and the like and may be used as a degreasing agent.

Each of the ether compounds is preferably prepared through the following series of reactions involving the stepwise chlorination and fluorination of 1,1,2 trifluoro-2-bromoethyl methyl ether:

$$CH_3OCF_2CHFBr \rightarrow CHCl_2OCF_2CFClBr$$
$$CCl_3OCF_2CHFBr$$
$$CHCl_2OCF_2CFClBr + HF + SbCl_5 \rightarrow CHF_2OCF_2CFClBr$$
$$CCl_3OCF_2CHFBr + HF + SbCl_5 \rightarrow CF_2ClOCF_2CHFBr$$

The compound 1,1,2 trifluoro-2-bromoethyl methyl ether is a well known material which can be prepared by reacting methanol $CH_3OH$ and trifluorobromoethylene $CF_2=CFBr$ in the presence of dissolved metallic sodium. The reaction is preferably carried out at temperatures below 30° C. in a vessel maintained under a slight positive pressure of nitrogen to prevent the entrance of air. On completion of the reaction the desired 1,1,2 trifluoro-2-bromoethyl methyl ether can be separated from the reaction mass and purified by fractional distillation under reduced pressure.

The 1,1,2 trifluoro-2-bromoethyl methyl ether precursor is then chlorinated to form $CHCl_2OCF_2CFClBr$ or $CCl_3OCF_2CHFBr$. The chlorination of $CH_3OCF_2CHFBr$ should be carried out in either a fully or partially transparent vessel so that photo energy can be supplied to the reaction. Suitable sources of photo energy are incandescent, ultraviolet and fluorescent lamps and even strong sun light. In view of the ready availability, low cost and ease of handling of incandescent lamps they are preferred for use as the illumination source.

The chlorination is carried out by bubbling gaseous chlorine into the liquid $CH_3OCF_2CHFBr$ while it is strongly illuminated. The chlorine is added at the same rate at which it reacts which can be determined by checking for chlorine vapor in the effluent from the chlorinator. The reaction is exothermic so cooling water should be supplied to the chlorination apparatus to control the reaction. The chlorination can be carried out at any temperature from 15° C. up to the boiling point of the chlorination mixture. Best results are usually found at 25°–35° C. where the reaction rate is fast enough and the formation of by-products does not present a serious problem.

The effluent from the chlorination apparatus should be passed through a water scrubber to dissolve the HCl which is formed. The chlorination should be continued until approximately 2.5 moles of HCl per mole of starting ether are detected by titration of the dissolved HCl with a standard base. The extent of the chlorination can be controlled by the amount of chlorine bubbled through the ether and determined by the amount of effluent HCl. If too little HCl is evolved it indicates that the chlorination products are predominantly the mono or dichloro product. If too much HCl is determined it indicates that polychloro products have been formed or that the ether has decomposed into undesirable chlorinated reaction products.

The lower chlorination products can be separated from the reaction mass by fractional distillation followed by further chlorination in order to raise the yield of the desired product.

Following the chlorination the reaction mass can be separated by fractional distillation or by vapor phase chromatography. If distillation is employed it is recommended that the pressure be reduced in view of the high molecular weight of the products $CHCl_2OCF_2CFClBr$ and $CCl_3OCF_2CHFBr$. Excessive heating should obviously be avoided in view of the possibility of decomposing the desired product.

The thus prepared $CHCl_2OCF_2CFClBr$ or $CCl_3OCF_2CHFBr$ should then be transferred to a reaction vessel that will not be attacked during the fluorination reaction. A stainless steel, copper, nickel, or platinum vessel would be quite suitable. A catalyst such as $SbCl_5SnCl_4$, or $SbF_5$ should be added to the chlorinated starting materials before beginning the fluorination. The fluorination reaction can be carried out by bubbling gaseous HF through the reaction mixture or by adding solid $SbF_3$ to the mixture.

The fluorination reaction is preferably carried out at 0° C. Higher or lower temperatures can be employed; however, it has been found that higher temperatures produce undesirable reaction products while lower temperatures cause a slow rate of reaction.

The effluent from the fluorination apparatus should be passed through a water scrubber to collect the HCl which is formed during the reaction. The amount of HCl formed is equivalent to the number of chlorine atoms exchanged for fluorine. Too little HCl evolved indicates incomplete exchange. Too much HCl indicates either over fluorination or decomposition. The fluorination should be continued until approximately two moles of HCl are collected for each mole of $CHCl_2OCF_2FClBr$ or $CCl_3OCF_2CHFBr$ indicating that two chlorine atoms have been exchanged. The preferred site for the fluorination is on the chlorine substituted methyl group resulting in the formation of $CHF_2OCF_2CFClBr$ or $CF_2ClOCF_2CHFBr$ depending on which chlorinated ether was used. The desired reaction product can be readily separated from the reaction mixture by fractional distillation.

EXAMPLE 1

SYNTHESIS OF $CH_3OCF_2CFHBr$

Sodium (10 g) was dissolved in methanol (500cc) and $CF_2=CFBr$ (500 g) was added slowly with cooling (less than 30° C.) and stirring. A positive pressure of nitrogen was maintained in the flask so that no air was introduced into the system. On completion of the reaction, the reaction mixture was poured into water and the crude product (540 g)

recovered was fractionally distilled at 100 mm to yield 475 g, b.p. 36° at 100 mm, $n_D^{20}$ 1.3660. This product was 99 percent pure and was satisfactory for chlorination.

EXAMPLE 2

PREPARATION OF $CHCl_2OCF_2CHFBr$

Approximately 1,000 grams of $CH_3OCF_2CHFBr$ prepared as illustrated in Example 1, were added to a water jacketed chlorinator fitted with a thermometer, a "DRY-ICE" cold finger type condenser and a fritted glass gas dispersion chlorine being bubbled through the solution which was exposed to a source of illumination. The effluent HCl was collected in a scrubber and aliquots were titrated with a standard base. The reaction was continued until 2.4 moles of HCl per mole of ether was titrated. Following the chlorination 887 g of material were recovered. The composition of the resulting material was determined by vapor phase chromatography and found to be:

9% $CHCl_2OCF_2CHFBr$
41% $CCl_3OCF_2CHFBr$
25% $CHCl_2OCF_2CFClBr$
23% $CCl_3OCF_2CFClBr$

Fractional distillation of this mixture gave 190 grams of $CHCl_2OCF_2FClBr$, b.p. 70° C. at 50 mm, $n_D^{20}$ 1.4230. Calculated for: $C_3HBrCl_3F_3O$; C, 12.15; H, 0.34; F, 19.2
Found: C, 12.45; H, 0.38; F, 18.94

The fractional distillation of this mixture also gave 169 grams of $CCl_3OCF_2CHFBr$; b.p. 72–75° C. at 50 mm, $n_D^{20}$ 1.4325.

Calculated for: $C_3HBrCl_3F_3O$; C, 12.15; H, 0.34; F, 19.2
Found: C, 12.03; H, 0.33; F, 18.88

EXAMPLE 3

PREPARATION OF $CHF_2OCF_2CFClBr$

A 1-liter 3-necked stainless steel flask was fitted with a copper "DRY-ICE" cold finger condenser, a stainless steel stirring shaft and gland and a copper gas inlet tube. To the flask there was then added 50 grams of $CHCl_2OCF_2CFClBr$ as prepared in Example 2 and 2.5 grams of $SbCl_5$. HF gas was then slowly bubbled through the stirred mixture which was maintained at 0° C. The reaction was run until 0.4 moles of HCl was collected, as indicated by the titration of the effluent HCl which was dissolved in water. Following the fluorination 25 grams of material were recovered. Fractional distillation using a 30 × 0.5 cm column packed with glass helices gave the pure product, b.p. 82° C., $n_D^{20}$ 1.3514. Calculated for: $C_3HBrClF_{cq}O$; C, 13.7; H, 0.38; F, 36.2
Found: C, 13.66; H, 0.37; F, 35.0

The structure of $CHF_2OCF_2CFClBr$ was determined by elemental analysis and by n.m.r. and infrared spectra. EXAMPLE 4

PREPARATION OF $CF_2ClOCF_2CHFBr$

A 1-liter 3-necked stainless steel flask was fitted with a copper "DRY-ICE" cold finger condenser, a stainless steel stirring shaft and gland and a copper gas inlet tube. To the flask there was then added 50 grams of $CCl_3ICF_2CHFBr$ as prepared in Example 2 and 2.5 grams of $SbCl_5$. HF gas was then slowly bubbled through the stirred mixture which was maintained at 0° C. The reaction was run until 0.4 moles of HCl was collected, as indicated by the titration of the effluent HCl which was dissolved in water. Following the fluorination 25 grams of material were recovered. Fractional distillation using a 30 × 0.5 cm column packed with glass helices gave the pure product, b.p. 81° C., $n_D^{20}$ 1.3465. Calculated for: $C_3HBrClF_5O$: C, 13.7; H, 0.38; F, 36.2
Found: C, 13.87; H, 0.40; F, 36.2

The structure of $CF_2ClOCF_2CHFBr$ was determined by elemental analysis and by n.m.r. and infrared spectra.

In order to determine the potency of 1,1,2 trifluoro-2-chloro-2-bromoethyl difluoromethyl ether and 1,1,2 trifluoro-2-bromoethyl difluorochloromethyl ether as inhalation anesthetics in combination with oxygen a series of tests were carried out on mice. The ether compounds tested were at least 99.5 percent pure as determined by vapor phase chromatography.

Groups of five mice were placed into a jar and exposed to a concentration of 1.25 percent by volume of $CHF_2OCF_2CFClBr$. After an average induction time of 2.3 minutes, which was free of excitation, the mice were anesthetized. During the period of anesthesia the mice showed no change in respiration and no visible untoward effects. A good anesthetic syndrome was produced and the mice were maintained in a light plane of anesthesia. Some peripheral vasodilation was noted. The mice recovered in about 2.45 minutes following removal from the jar and showed no after effects.

Groups of five more mice were then given a similar test with 2.5 percent by volume of the compound. After an average induction time of 1.35 minutes an excellent anesthetic syndrome was produced. Anesthesia was deep and relaxation excellent. The respiration was slightly labored and some peripheral vasodilation was noted. The induction period was very smooth with no apparent excitation. On removal from the jar the mice fully recovered in about 7 minutes Groups of five mice were also placed into a jar and exposed to a concentration of 1.25 percent by volume of $CF_2ClOCF_2CHFBr$. After an induction time of 4.3 minutes, which was free of excitation, the mice were anesthetized. During the period of anesthesia the mice showed no change in respiration and no visible untoward effects. A good anesthetic syndrome was produced and the mice were maintained in a light plane of anesthesia. The mice recovered in 1.3 minutes following removal from the jar and showed no after effects.

Groups of five more mice were then given a similar test with 2.5 percent by volume of the compound. After an induction time of 1.2 minutes an excellent anesthetic syndrome was produced. Anesthesia was deep and relaxation excellent. The respiration and color were normal and no peripheral vasodilation was noted. The induction period was very smooth with no apparent excitation. On removal from the jar the mice fully recovered in 2.5 minutes.

The compound 1,1,2 trifluoro-2-chloro-2-bromoethyl difluoromethyl ether and 1,1,2 trifluoro-2-bromoethyl difluorochloromethyl ether exhibit excellent anesthetic properties in inhalation anesthetic susceptible mammals. The compounds are non-flammable and soda lime stable. Each compound lends itself to effective use as an inhalant anesthetic in respirable mixtures containing life-supporting concentrations of oxygen. In addition, studies with the agents have shown that they are highly potent, afford good muscular relaxation, are non-toxic, have a high margin of safety, afford rapid induction free of excitation and rapid recovery, and afford ease of control of the level of anesthesia.

The effective amount of $CHF_2OCF_2CFClBr$ and $CF_2ClOCF_2CHFBr$ to be employed depends on the level of anesthesia to which the mammal is to be brought, the rate at which anesthesia is to be induced, and the length of time over which anesthesia is to be maintained. Volume percentages of $CHF_2OCF_2CFClBr$ or $CF_2ClOCF_2CHFBr$ in oxygen from a fraction of a percent up to several percent, can be employed. The person controlling the anesthesia can easily regulate the amount of the particular ether to be used, starting with a small amount and gradually increasing the amount until the desired plane of anesthesia is reached. By then monitoring the physical properties of the mammal, as is the usual procedure, the duration and plane of anesthesia can be readily controlled.

It should be understood that the foregoing disclosure relates only to preferred embodiments of the invention and that it is intended to cover all changes and modifications of the examples of the invention herein chosen for the purpose of the disclosure which do not constitute departure from the spirit and scope of the invention.

I claim:

1. An inhalant anesthetic composition comprising a life-supporting amount of oxygen and an inhalant anesthetic compound of the formula $$CF_2XOCF_2CFBrX$$

wherein X is alternately chlorine and hydrogen, one X is chlorine, in a suitable proportion for the production of anesthesia.

2. An inhalant anesthetic composition as set forth in claim 1 wherein the inhalant anesthetic compound is $CHF_2OCF_2CFClBr$.

3. An inhalant anesthetic composition as set forth in claim 1 wherein the inhalant anesthetic compound is $CF_2ClOCF_2CHFBr$.

4. The method of anesthetizing an inhalation anesthetic susceptible mammal which comprises administering by inhalation to said mammal an effective amount of inhalant anesthetic compound of the formula $$CF_2XOCF_2CFBrX$$

wherein X is alternately chlorine and hydrogen, one X is chlorine, along with sufficient oxygen to support life.

5. The method of anesthetizing an inhalation anesthetic susceptible mammal as set forth in claim 4 wherein the inhalant anesthetic has the formula $CHF_2OCF_2CFClBr$.

6. The method of anesthetizing an inhalation anesthetic susceptible mammal as set forth in claim 4 wherein the inhalant anesthetic has the formula $CF_2ClOCF_2CHFBr$.

* * * * *